Feb. 24, 1942.  L. E. REPSHER ET AL  2,274,432
EXTRUSION APPARATUS FOR COATING VENEERS
Filed June 7, 1940  2 Sheets-Sheet 1
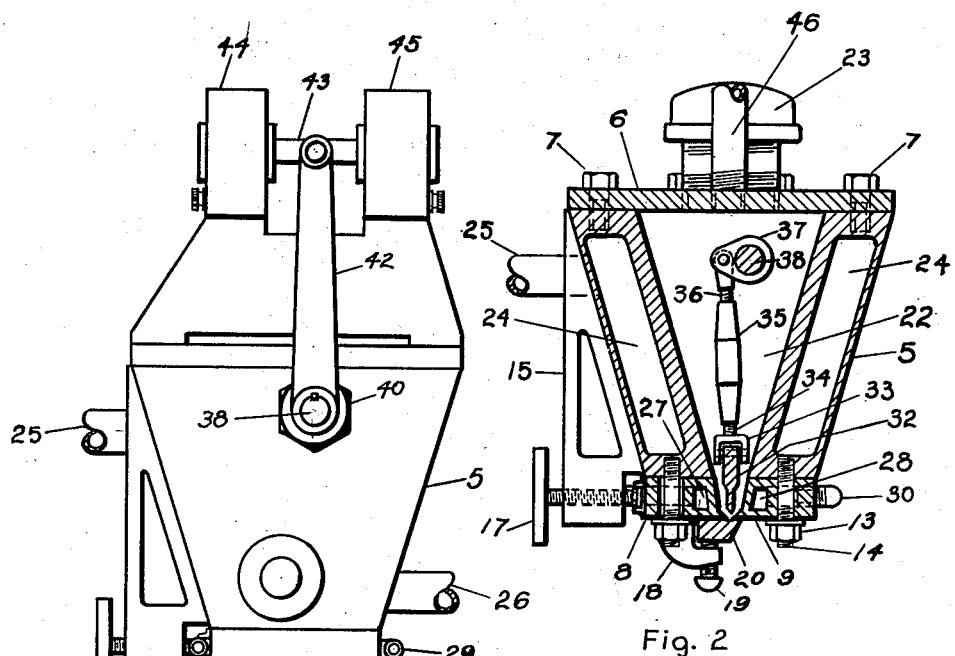
Fig. 2
Fig. 3
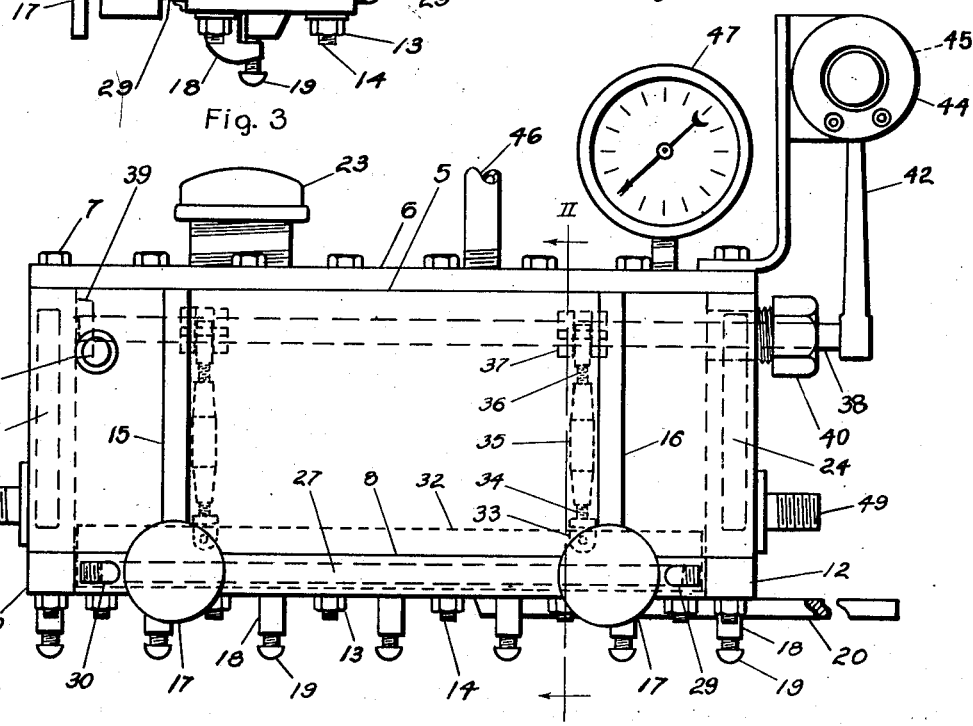
Fig. 1
INVENTORS
LEONARD E. REPSHER
CHARLES W. HAMMOND
BY
ATTORNEY

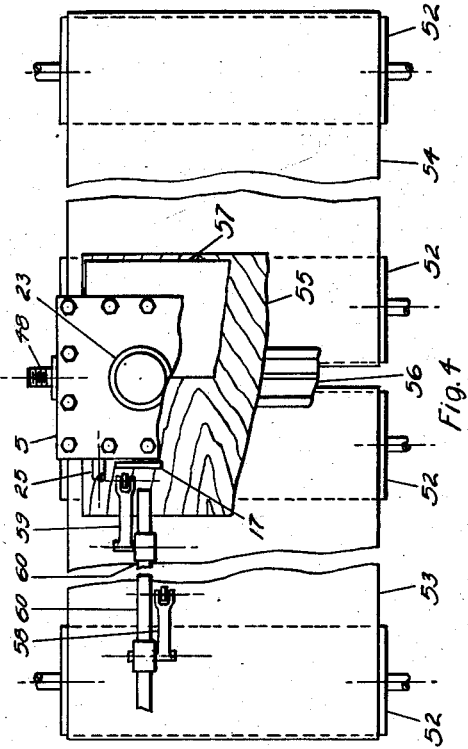
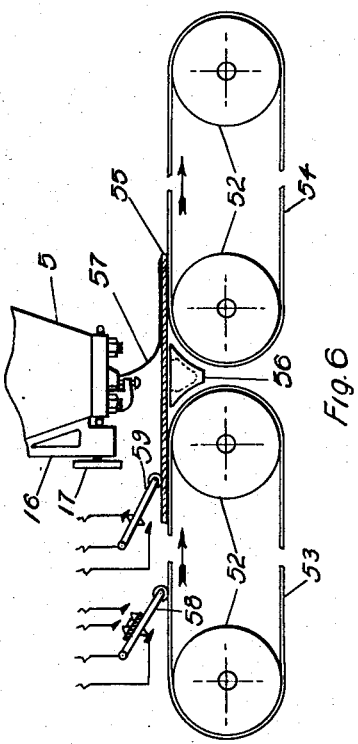
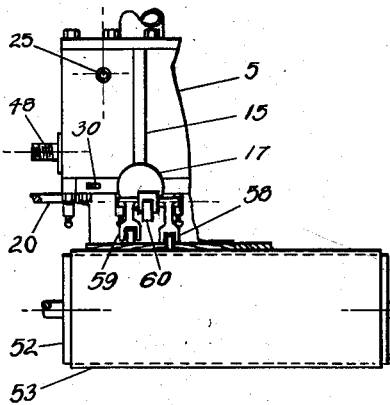
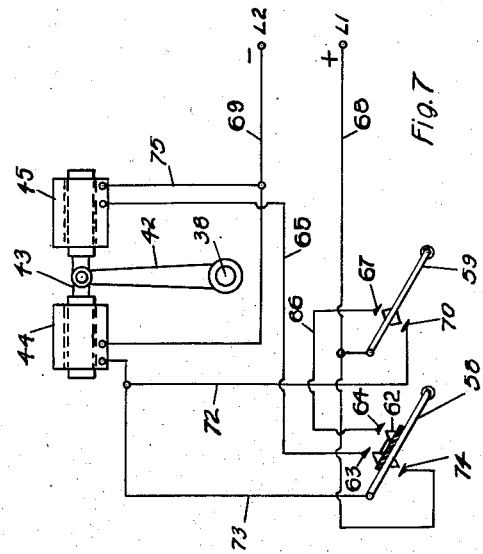

Patented Feb. 24, 1942

2,274,432

UNITED STATES PATENT OFFICE 2,274,432

EXTRUSION APPARATUS FOR COATING VENEERS

Leonard E. Repsher, East Orange, and Charles W. Hammond, Bloomfield, N. J.

Application June 7, 1940, Serial No. 339,214

5 Claims. (Cl. 91—43)

The present invention relates to extrusion apparatus for forming thin sheets of plastic material, and in its more specific aspects, it relates to the coating of veneer for the manufacture of plywood.

It has long been the practice in the art of forming plywood to coat the thin sheets with a vegetable glue, after which the composite board is formed by applying pressure. However, plywood so formed has been subject to the disadvantage that it is readily susceptible to moisture, which ultimately causes separation of the individual layers of the composite board, destroying the finished product.

To avoid separation, it is now not uncommon in the art to use a resin, such as a phenolic condensation product or the like, as a cementing agent, since it not only forms a firm bond for the individual sheets, but is not readily affected by moisture and ambient temperature changes.

In the extrusion of such heat reactive resins, either into sheet form or as a coating for plywood, it is essential that the resin flow freely and in a thin layer of uniform thickness. Moreover, to prevent wastage of the material and its application to the carrier or surfaces other than the surface it is desired to coat, extrusion of the material must necessarily be accurately controlled.

It is accordingly an object of the present invention to provide an extrusion apparatus which is readily adjustable to control the desired thickness and width of the extruded material.

Another object of the present invention is the provision of an extrusion apparatus for dispensing heat reactive and/or thermoplastic resins and coating individual sheets to be superimposed to form plywood wherein the thickness of the applied coating is accurately controlled.

Another object of the present invention is the provision of an extrusion apparatus in the form of a hopper for holding resin and wherein the material is maintained at a uniform temperature so as to control the viscosity of the resin until completely dispensed through the elongated outlet orifice.

A further object of the present invention is the provision of an extrusion apparatus for dispensing resin to coat veneer sheets intended to be superimposed to form plywood wherein the extrusion of the resin is automatically controlled by movement of the veneer sheets to be coated.

Still further objects of the present invention will become obvious to those skilled in the art by reference to the accompanying drawings wherein:

Fig. 1 is a front elevational view of the extrusion apparatus of the present invention;

Fig. 2 is a cross-sectional view of the extrusion apparatus or hopper taken on the line II—II of Fig. 1 and looking in the direction indicated by the arrows;

Fig. 3 is a side elevational view of the apparatus as shown in Fig. 1;

Fig. 4 is a plan view of the extrusion apparatus of the present invention and showing more or less schematically its application to the coating of thin sheets to be superimposed to form plywood with portions thereof broken away to better illustrate the various parts;

Fig. 5 is an end view of the apparatus shown in Fig. 4 also with portions thereof broken away for the sake of simplicity;

Fig. 6 is a side view of the apparatus as shown in Fig. 4, showing schematically the extrusion apparatus of the present invention for coating veneer sheets, with portions thereof broken away, and Fig. 7 is a diagrammatic illustration of the control circuit for automatically opening and closing the hopper in response to movement of the veneer sheets.

Referring now to the drawings in detail, the extrusion apparatus as shown comprises a hopper shown generally at 5. This hopper is formed with downwardly converging sides, as can be more readily seen in Figs. 2 and 3, and is closed at the top with a head 6 secured to the hopper in any suitable manner, such as by cap screws or the like 7.

The narrower width bottom of the hopper 5 is provided with a pair of plates 8 and 9 extending longitudinally of the hopper between a pair of end blocks 10 and 12 and held in place by a plurality of nuts 13 secured to spaced studs 14 protruding from the hopper. By reference to Fig. 2 it will be noted that the openings in the plate 8 are of slightly greater diameter than necessary to accommodate the studs 14 so as to allow movement of the plate 8 relative to the plate 9. To effect this latter adjustment a pair of brackets 15 and 16 project from one of the converging sides of the hopper 5 (Fig. 2), and adjacent the plate 8 a hand knob 17 is provided which threadedly passes through each bracket with the free end thereof passing through an opening in the plate 8 and having a flanged end of slightly larger diameter than the opening so as to push or pull the plate 8.

To adjust the spacing between the longitudinally disposed plates 8 and 9, the nuts 13 supporting the plate 8 are loosened and the hand knobs 17 screwed in or out. Thus the spacing between the plates 8 and 9 may be increased or decreased to form an elongated discharge slot or orifice for the extrusion of material from the hopper, simply by moving in or out on the hand screws 17, which thus controls the thickness of the extruded material.

In order to regulate the width of the elongated orifice a plurality of angular brackets 18 are shown suspended from the plate 8 which are provided with set screws 19. An elongated bar 20 slides longitudinally of the hopper upon these set screws, and when the desired width slot is obtained, the set screws are tightened which thus retains the bar in firm engagement with the plates 8 and 9, thus leaving open the remainder of the length of the slot.

Referring now more particularly to Fig. 2, it will be noted that the converging sides of the hopper form a substantially inverted triangular-shaped chamber 22 adapted to receive a resin through a filler cap opening 23. In order to maintain the resin within the chamber 22 at the desired viscosity, the walls of the hopper are hollow so as to form chambers 24 for the circulation of a heating medium, such as live steam, which may enter through a conduit 25 (Fig. 3) and exhaust through a conduit 26 (Fig. 3).

The adjacent surfaces of the plates 8 and 9 follow substantially the same degree of angulation for a portion of their cross-section, as do the converging sides of the hopper 5; but near the bottom of the plates, constituting the elongated orifice, their angulation becomes considerably more acute for the purpose of forming a valve seat so as to more accurately control the thickness of the extruded material.

For the purpose of preventing the plates 8 and 9 from cooling the resin below its temperature within the chamber 22 and thus affecting its viscosity at the moment of extrusion, or for the purpose of giving superheat at the last moment before extrusion of the resin, the plates 8 and 9 are also provided with hollow chambers or passageways 27 and 28 for the circulating of a heating medium, such as live steam, which may enter through an inlet conduit 29 and exhaust through a conduit 30 provided in each plate, despite the fact that these plates 8 and 9 are adjustable.

An elongated valve member 32 in the form of a knife blade is positioned interiorly of the hopper 5, and is provided with downwardly converging sides near its lower edge so as to conform to the contour of the valve seat formed between the plates 8 and 9, and when lowered into the seat completely shuts off the flow of resin from the hopper. The valve 32 is supported by a dual link arrangement which as shown comprises an inverted U-shaped bracket 33 pivotally secured to the valve member 32 near each end, as can be seen in the dotted lines of Fig. 1. This U-shaped bracket is in turn rigidly secured to a threaded shaft 34 and a turnbuckle 35 connects this threaded shaft 34 to a similar threaded shaft 36 pivotally connected to a crank member 37, as can be readily seen from Fig. 2.

The crank members 37 are secured to a shaft 38 journalled in a bracket bearing 39 (Fig. 1) and extending through a packed bearing 40 to the outside of the hopper. In order to rotate the shaft sufficiently to raise and lower the valve member 32 relative to the seat formed between the plates 8 and 9, a crank 42 is rigidly secured thereto with the upper end of the crank pivotally secured to an armature 43 common to a pair of solenoids 44 and 45.

Upon energization of the "close" solenoid 44, the armature 43 is moved to the left, as viewed from Fig. 3, which causes a similar movement of the upper end of the crank 42. A counter-clockwise rotation of the shaft 38 accordingly results, which causes a downward movement of the link arrangement accompanied by a closing of the valve 32 since it will engage the seat formed between the plates 8 and 9. Despite the comparatively slight rotation of the shaft 38, it is sufficient to operate the valve inasmuch as its length of travel is initially adjusted by the turnbuckles 35.

In a similar manner energization of the "open" solenoid 45 will cause movement of the upper end of the crank 42 to the right as seen from Fig. 3. Opposite or clockwise rotation of the shaft 38 ensues with upward movement of the link support and raising of the valve, thus allowing fluid pressure admitted through a conduit 46 to force the plastic resin out of the elongated orifice or opening at the bottom of the hopper. The hopper may also be provided with a pressure gauge 47 for recording the fluid pressure admitted to the hopper 5.

In commercial application of the hopper 5, it is supported by trunnions 48 and 49 and suspended above an endless conveyor, as shown in Figs. 4, 5, and 6.

Suitable brackets (not shown), which are engaged by the trunnions 48 and 49, may extend upwardly from the conveyor frame or depend from the ceiling. Referring now more particularly to Figs. 4, 5, 6, and 7, an endless conveyor, which for convenience may be in two sections, is shown wherein a plurality of drums or rollers 52 are suitably journalled in a frame (not shown).

An endless belt of canvas, leather, or other suitable material 53, is looped around one pair of drums or rollers and a similar belt 54 loops around the remaining pair or rollers 52, with both belts being movable in the direction shown by the arrows in Fig. 6. In order to coat a sheet of veneer 55 with the resin retained in the hopper 5, it is placed upon the belt 53 and carried thereby across an intervening supporting plate or idler roller 56 onto the belt 54 and thus beneath the hopper 5, the latter being previously adjusted by the hand screws 17 to give the desired thickness of coating and by the bar 20 for a width of coating 57 corresponding to that of the panel 55.

For the purpose of controlling the opening and closing of the hopper by energization of the solenoids 44 and 45, as previously described, a suitable electrical arrangement is provided which automatically opens and closes the valve 32. Such control may comprise a pair of photoelectric cells and light sources or, as shown, a pair of switches 58 and 59 provided with rollers for riding on the veneer 55 are supported by a bracket 60 above the conveyor.

By reference to Fig. 6 it will be noted that the veneer 55 to be coated first raises the switch 58 which is provided with an insulated contact bar 62 engageable with a pair of contact terminals 63 and 64. The contact terminal 63 is connected by a conductor 65 to one end of the winding of the "open" solenoid 45 while the contact terminal 64 is connected by a conductor 66 to a contact terminal 67 adjacent the switch 59. Hence, upon raising of the switch 58 no circuits are completed by this switch, but the system is conditioned for further operation. Upon raising of the switch 58, however, a normally closed circuit to the "close" solenoid is interrupted as hereinafter described.

As the veneer 55 progresses toward the hopper 5, it next causes the switch 59 to raise, completing a circuit to the "open" solenoid 45 and opens the valve 32. This circuit may be traced from one side of a source of supply of the customary domestic potential L1, through a conductor 68 to the switch arm 59; and since the latter is in engagement with the terminal 67, current flows through the conductor 66, from contact terminal 64 to terminal 63, through the insulating bar 62, and thence by means of conductor 65 through the "open" solenoid 45 and back through conductors 75 and 69 to the opposite side of the supply source L2.

This accordingly energizes the "open" solenoid 45, and opens the valve 32 and since the end of veneer 55 has now moved to a position beneath the hopper 5, the resin 57 gravitates and contacts the veneer. At the same time that the switch 59 completes the circuit to the "open" solenoid 45, a further circuit to the "close" solenoid 44 is also interrupted, as hereinafter described. As movement of the veneer 55 continues, the resin 57 is spread over the veneer until the end rides from beneath the switch 59, allowing it to drop downward onto the conveyor. This causes the switch 59 to engage a contact terminal 70 which is connected by a conductor 72 to one end of the winding of solenoid 44; and since the opposite end of this winding is also connected by the conductor 69 to the opposite side of the source L2, the solenoid 44 is energized and causes closure of the valve 32.

It will be noted from Figs. 6 and 7 that the veneer 55 will naturally ride from beneath the switch 58 prior to the switch 59 allowing the former to drop. This interrupts the circuit to the "open" solenoid 45 due to separation of the contact terminals 63 and 64 by the insulated bar 62. At the same time the "close" solenoid 44 is energized since the switch arm 58 is connected by a conductor 73 to one end of the winding 44, and when in the down position, it engages a contact terminal 74 connected to the conductor 68 and hence to the opposite side of the source of supply L1 to that to which the other end of the winding of solenoid 44 is connected L2.

The "close" solenoid 44 is accordingly closed by the veneer 55 moving from beneath either of the switches 58 or 59; but inasmuch as the switches 58 and 59 are adjustable upon the brackets 60 longitudinally of the conveyor, they are so positioned as to time operation of the valve 32 in accordance with the viscosity of the resin. In other words, despite the fact that the switch 58 closes the valve 32 prior to complete coating of the veneer 55, nevertheless by correct positioning of the switches 58 and 59, any desired time interval can be obtained commensurate with the viscosity of the resin so that the valve is closed against the resin. Moreover, this action enables complete coating of the veneer sheets when successively carried by the conveyor, as the valve will continue to open and close by the action of the switches being raised and lowered by the veneer even though the switch 58 may close the valve between successive sheets of veneer.

It will thus become obvious to those skilled in the art that an extrusion apparatus is herein provided for dispensing resins. Inasmuch as the apparatus is fully adjustable, the thickness and width of the extruded resin can be selected as desired, and the viscosity thereof can be readily controlled since the temperature of the outlet orifice can be maintained the same as the entire hopper or varied to a higher or lower temperature, despite the fact that the orifice is adjustable. Moreover, operation of the apparatus is automatically controlled by movement of the material to be coated so as to prevent wastage of the resin and the inadvertent coating of the conveyor or portions of the material that it is not desired to coat.

Although one embodiment of the present invention has been shown and described, it is to be understood that other modifications thereof may be made without departing from the spirit and scope of the appended claims.

We claim:

1. An apparatus for extruding a web of plastic material comprising a hopper for holding said plastic material, adjustable means operable to form an outlet orifice of predetermined area for said hopper to control the width and thickness of the material extruded from said orifice, means for supplying heat to said hopper to maintain said material in plastic form and at a preselected viscosity, and means disposed adjacent said adjustable outlet orifice for heating the latter to a temperature higher than said hopper to control the viscosity of said material at the point of extrusion from said orifice.

2. An apparatus for extruding a web of plastic material comprising a hopper for holding said plastic material, adjustable means operable to form an outlet orifice of predetermined area for said hopper to control the width and thickness of the material extruded from said orifice, means for applying heat to said hopper to maintain said material in plastic form and at a preselected viscosity, and means independent of said last mentioned means and disposed adjacent said adjustable outlet orifice for applying heat to the latter to control the viscosity of said material as it is extruded from said orifice.

3. An apparatus for extruding a web of plastic material comprising a hopper for holding said plastic material, a source of fluid pressure for forcing said material from said hopper, adjustable means operable to form an outlet orifice of predetermined area for said hopper comprising a pair of plates movable toward and away from each other to control the thickness of the extruded material and a bar movable longitudinally of said hopper to control the width of the extruded material, means for applying heat to said hopper to maintain said material in plastic form and at a preselected viscosity, and means independent of said last mentioned means and disposed adjacent said pair of movable plates for heating the latter to a temperature higher than that of said hopper to control the viscosity of said material as it is extruded between said plates forming the outlet orifice.

4. An apparatus for extruding a web of plastic material comprising a hopper for holding said plastic and having hollow side walls, adjustable means operable to form an outlet orifice of predetermined area for said hopper comprising a pair of hollow plates movable toward and away from each other to control the thickness of the extruded material and a bar movable longitudinally of said hopper to control the width of the extruded material, means for circulating a heating medium through the hollow side walls of said hopper to maintain said material in plastic form and at a preselected viscosity, and means for circulating a heating medium through said hollow plates to heat said outlet orifice to a temperature higher than said hopper to control the viscosity of said material when extruded through said orifice into contact with the atmosphere.

5. An apparatus for extruding a web of plastic material comprising a hopper for holding said plastic material and having hollow side walls, a source of fluid pressure for forcing said material from said hopper, adjustable means operable to form an outlet orifice of predetermined area for said hopper comprising a pair of hollow plates movable toward and away from each other to control the thickness of the extruded material and a bar movable longitudinally of said hopper to control the width of the extruded material, inlet and outlet openings for circulating a heating medium through the hollow walls of said hopper to maintain said material in plastic form and at a preselected viscosity, and inlet and outlet conduits for circulating a heating medium through said hollow plates to heat said outlet orifice to a temperature higher than said hopper to control the viscosity of said material as it is extruded through said orifice into contact with the atmosphere.

LEONARD E. REPSHER.
CHARLES W. HAMMOND.